US012688178B2

(12) United States Patent
Choi et al.

(10) Patent No.: US 12,688,178 B2
(45) Date of Patent: Jul. 21, 2026

(54) USER DATA MANAGEMENT SERVER MANAGING BIOMETRIC DATA FOR EACH DRIVER IN VEHICLE SHARING SYSTEM

(71) Applicant: SAMSUNG ELECTRONICS CO., LTD., Suwon-si (KR)

(72) Inventors: Yangwook Choi, Suwon-si (KR); Kirock Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 18/611,887

(22) Filed: Mar. 21, 2024

(65) Prior Publication Data
US 2025/0094404 A1 Mar. 20, 2025

(30) Foreign Application Priority Data
Sep. 14, 2023 (KR) ........................ 10-2023-0122680

(51) Int. Cl.
*G06Q 50/43* (2024.01)
*G06F 16/22* (2019.01)

(52) U.S. Cl.
CPC ......... *G06F 16/2282* (2019.01); *G06Q 50/43* (2024.01)

(58) Field of Classification Search
None
See application file for complete search history.

(56) References Cited

U.S. PATENT DOCUMENTS

| | | | |
|---|---|---|---|
| 5,809,558 A | * | 9/1998 | Matthews ........... G06F 12/0246 |
| | | | 711/E12.008 |
| 7,161,468 B2 | | 1/2007 | Hwang et al. |
| 8,000,502 B2 | | 8/2011 | Dave et al. |
| 10,824,704 B2 | | 11/2020 | Weller et al. |
| 2004/0044869 A1 | * | 3/2004 | Louie ................. G06F 12/0246 |
| | | | 711/E12.008 |
| 2004/0236954 A1 | * | 11/2004 | Vogt ........................ G07C 9/37 |
| | | | 713/186 |
| 2005/0001028 A1 | | 1/2005 | Zuili |
| 2010/0199024 A1 | * | 8/2010 | Jeong ................. G06F 12/0246 |
| | | | 711/170 |

(Continued)

FOREIGN PATENT DOCUMENTS

| | | |
|---|---|---|
| KR | 10-0528328 B1 | 11/2005 |
| KR | 10-0921546 B1 | 10/2009 |

OTHER PUBLICATIONS

Ciociola, et al., "Data driven scalability and profitability analysis in free floating electric car sharing systems", Information Sciences, vol. 621, Apr. 2023, pp. 545-561.

*Primary Examiner* — Yu Zhao
(74) *Attorney, Agent, or Firm* — Morgan, Lewis & Bockius LLP

(57) ABSTRACT
A shared vehicle management server of a vehicle sharing system, configured to allow a plurality of users to share and use vehicles, includes an interface configured to receive biometric data from the plurality of users, a storage device configured to store the biometric data received through the interface, and a controller configured to assign a unique tag number to each user and to manage biometric data of each user using the unique number. The controller manages to store the biometric data of each user in the same storage area using the unique tag number.

16 Claims, 23 Drawing Sheets

(56)            References Cited

U.S. PATENT DOCUMENTS

| 2013/0176108 A1* | 7/2013 | Madhani | G06F 21/32 |
| | | | 340/5.82 |
| 2014/0129053 A1 | 5/2014 | Kleve et al. | |
| 2014/0245408 A1* | 8/2014 | Ballapalle | H04W 12/126 |
| | | | 726/6 |
| 2016/0085585 A1* | 3/2016 | Chen | G06F 12/08 |
| | | | 711/205 |
| 2021/0261096 A1 | 8/2021 | Kabany | |
| 2022/0094676 A1 | 3/2022 | Hofmann | |

* cited by examiner

Figure 7:
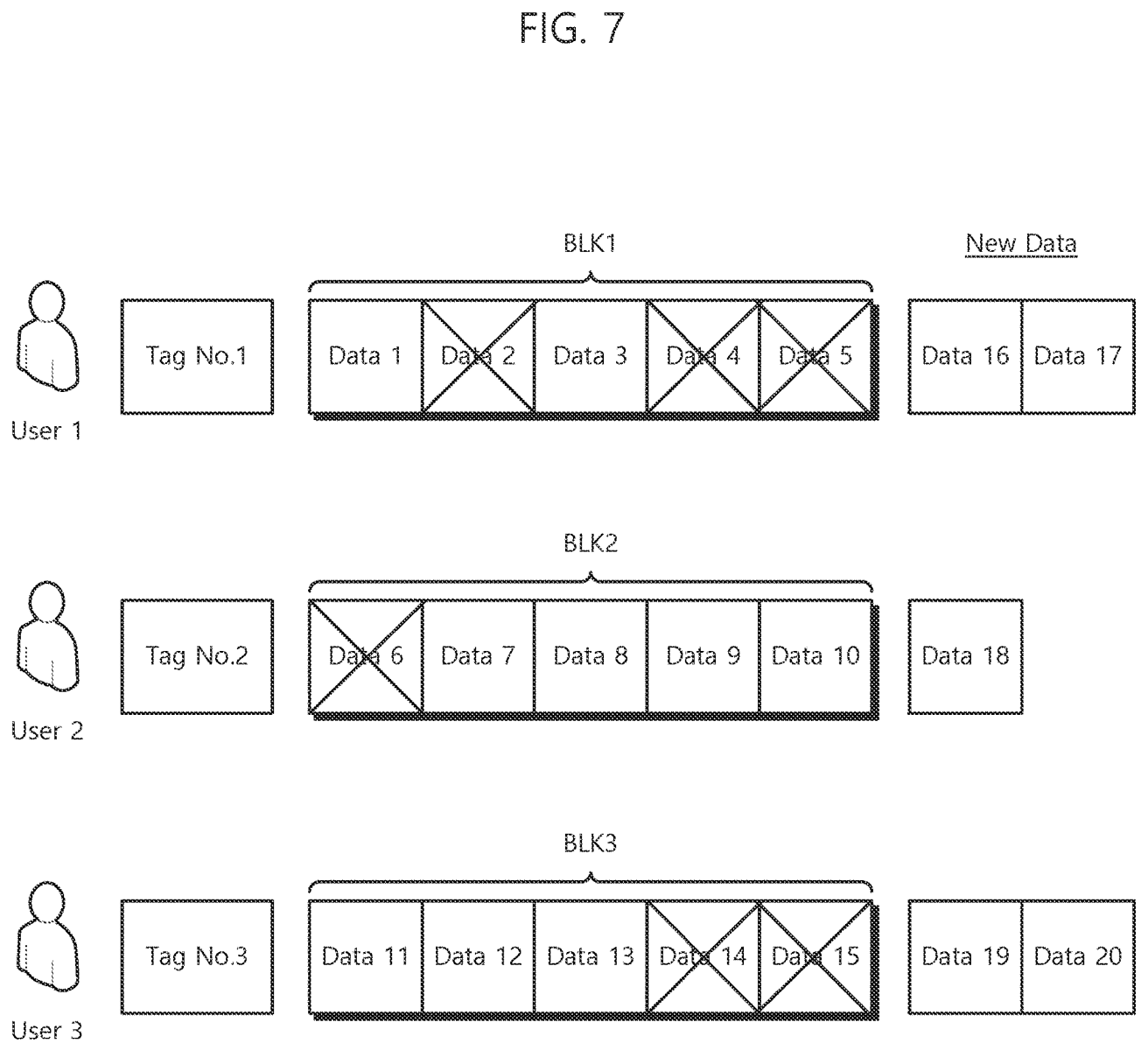

New Data

| | Data 16 | Data 17 |
| --- | --- | --- |

| | Data 18 |
| --- | --- |

| | Data 19 | Data 20 |
| --- | --- | --- |

BLK1

| Data 1 | Data 2 | Data 3 | Data 4 | Data 5 |
| --- | --- | --- | --- | --- |

BLK2

| Data 6 | Data 7 | Data 8 | Data 9 | Data 10 |
| --- | --- | --- | --- | --- |

BLK3

| Data 11 | Data 12 | Data 13 | Data 14 | Data 15 |
| --- | --- | --- | --- | --- |

| Tag No.1 |
| --- |

User 1

| Tag No.2 |
| --- |

User 2

| Tag No.3 |
| --- |

User 3

| Biometric Data Information (1211) | Tag Number Information (1212) |
|---|---|
| QWER123 | 0x1000 |
| ASDF456 | 0x2000 |
| ZXCV789 | 0x3000 |

| | 1221a | 1222a | 1221b | 1222b | 1221c | 1222c | 1221d | 1222d |
|---|---|---|---|---|---|---|---|---|
| 0x1000 | User Name | Hong Gildong | Recent Departure Location | Gwonseon-gu, Suwon-si | Recent Arrival Location | Yeongtong-gu, Suwon-si | Recent Driving Distance | 20km |
| 0x2000 | Recent Departure Location | Gangnam-gu, Seoul | Recent Arrival Location | Ansan-si, Gyeonggi-do | Carbon Emission | 5L | Monthly Driving Distance | 840km |
| 0x3000 | Rearview Mirror Angle | 78° | Preferred Frequency | 91.9MHz | Seat Setting | 1 | Height of Steering Wheel | 3 |
| ... | ... | ... | ... | ... | ... | ... | ... | ... |
| 0x6000 | Recent Departure Location | Hwaseong-si, Gyeonggi-do | Recent Arrival Location | Namyangju-si, Gyeonggi-do | Recent Driving Distance | 32km | - | - |

| Temporary Tag Number Information (1231) | Additional Zone Number Information (1232) | Temporary Zone Number Information (1233) |
|---|---|---|
| 0x1000 | - | - |
| 0x2000 | - | - |
| 0x3000 | - | - |
| ... | ... | ... |

| 1221a | 1222a | 1221b | 1222b | 1221c | 1222c | 1221d | 1222d |
|---|---|---|---|---|---|---|---|
| User Name | Hong Gildong | Recent Departure Location | Gwonseon-gu, Suwon-si | Recent Arrival Location | Yeongtong-gu, Suwon-si | Recent Driving Distance | 20km |
| Recent Departure Location | Gangnam-gu, Seoul | Recent Arrival Location | Ansan-si, Gyeonggi-do | Carbon Emission | 5L | Monthly Driving Distance | 840km |
| Angle of Rearview Mirror | 78° | Preferred Frequency | 91.9MHz | Seat Setting | 1 | Height of Steering Wheel | 3 |
| | | | | | | | |

1210

| Biometric data Information (1211) | Tag Number Information (1212) |
|---|---|
| QWER123 | 0x1000 |
| ASDF456 | 0x2000 |
| ZXCV789 | 0x3000 |
| ⋮ | |

| Biometric data Information (1211) | Tag Number Information (1212) |
|---|---|
| QWER123 | 0x1000 |
| ASDF456 | 0x2000 |
| ZXCV789 | 0x3000 |

1230

| Temporary Tag Number Information (1231) | Additional Zone Number Information (1232) | Temporary Zone Number Information (1233) |
|---|---|---|
| 0x1000 | 0x6000 | - |
| 0x2000 | - | - |
| 0x3000 | - | - |

1220

| | 1221a | 1222a | 1221b | 1222b | 1221c | 1222c | 1221d | 1222d |
|---|---|---|---|---|---|---|---|---|
| 0x1000 | User Name | Hong Gildong | Recent Departure Location | Gwonseon-gu, Suwon-si | Recent Arrival Location | Yeongtong-gu, Suwon-si | Recent Driving Distance | 20km |
| 0x2000 | Recent Departure Location | Gangnam-gu, Seoul | Recent Arrival Location | Ansan-si, Gyeonggi-do | Carbon Emission | 5L | Monthly Driving Distance | 840km |
| 0x3000 | Rearview Mirror Angle | 78° | Preferred Frequency | 91.9MHz | Seat Setting | 1 | Height of Steering Wheel | 3 |
| ... | ... | ... | ... | ... | ... | ... | ... | ... |
| 0x6000 | Recent Departure Location | Hwaseong-si, Gyeonggi-do | Recent Arrival Location | Namyangju-si, Gyeonggi-do | Recent Driving Distance | 32km | - | - |

| Biometric data Information (1211) | Tag Number Information (1212) |
|---|---|
| QWER123 | 0x1000 |
| ASDF456 | 0x2000 |
| ZXCV789 | 0x3000 |

1230

| Temporary Tag Number Information (1231) | Additional Zone Number Information (1232) | Temporary Zone Number Information (1233) |
|---|---|---|
| 0x1000 | 0x6000 | 0x7000 |
| 0x2000 | - | - |
| 0x3000 | - | - |

1220

| | 1221a | 1222a | 1221b | 1222b | 1221c | 1222c | 1221d | 1222d |
|---|---|---|---|---|---|---|---|---|
| 0x1000 | User Name | Hong Gildong | Recent Departure Location | Gwonseon-gu, Suwon-si | Recent Arrival Location | Yeongtong-gu, Suwon-si | Recent Driving Distance | 20km |
| 0x2000 | Recent Departure Location | Gangnam-gu, Seoul | Recent Arrival Location | Ansan-si, Gyeonggi-do | Carbon Emission | 5L | Monthly Driving Distance | 840km |
| 0x3000 | Rearview Mirror Angle | 78° | Preferred Frequency | 91.9MHz | Seat Setting | 1 | Height of Steering Wheel | 3 |
| ... | ... | ... | ... | ... | ... | ... | ... | ... |
| 0x6000 | Recent Departure Location | Hwaseong-si, Gyeonggi-do | Recent Arrival Location | Namyangju-si, Gyeonggi-do | Recent Driving Distance | 32km | - | - |
| 0x7000 | User Name | Hong Gildong | Recent Departure Location | Hwaseong-si, Gyeonggi-do | Recent Arrival Location | Namyangju-si, Gyeonggi-do | Recent Driving Distance | 32km |

| Biometric data Information (1211) | Tag Number Information (1212) |
|---|---|
| QWER123 | 0x1000 |
| ASDF456 | 0x2000 |
| ZXCV789 | 0x3000 |

1230

| Temporary Tag Number Information (1231) | Additional Zone Number Information (1232) | Temporary Zone Number Information (1233) |
|---|---|---|
| 0x1000 | - | - |
| 0x2000 | - | - |
| 0x3000 | - | - |

1220

| | 1221a | 1222a | 1221b | 1222b | 1221c | 1222c | 1221d | 1222d |
|---|---|---|---|---|---|---|---|---|
| 0x1000 | User Name | Hong Gildong | Recent Departure Location | Gwonseon-gu, Suwon-si | Recent Arrival Location | Yeongtong-gu, Suwon-si | Recent Driving Distance | 20km |
| 0x2000 | Recent Departure Location | Gangnam-gu, Seoul | Recent Arrival Location | Ansan-si, Gyeonggi-do | Carbon Emission | 5L | Monthly Driving Distance | 840km |
| 0x3000 | Rearview Mirror Angle | 78° | Preferred Frequency | 91.9MHz | Seat Setting | 1 | Height of Steering Wheel | 3 |
| ... | ... | ... | ... | ... | ... | ... | ... | ... |
| 0x6000 | - | - | - | - | - | - | - | - |
| 0x7000 | - | - | - | - | - | - | - | - |

| Biometric data Information (1211) | Tag Number Information (1212) |
|---|---|
| QWER123 | 0x1000 |
| ASDF456 | 0x2000 |
| ZXCV789 | 0x3000 |

1230

| Temporary Tag Number Information (1231) | Additional Zone Number Information (1232) | Temporary Zone Number Information (1233) |
|---|---|---|
| 0x1000 | - | - |
| 0x2000 | - | - |
| 0x3000 | - | - |

1220

| | 1221a | 1222a | 1221b | 1222b | 1221c | 1222c | 1221d | 1222d |
|---|---|---|---|---|---|---|---|---|
| 0x1000 | User Name | Hong Gildong | Recent Departure Location | Gwonseon-gu, Suwon-si | Recent Arrival Location | Yeongtong-gu, Suwon-si | Recent Driving Distance | 20km |
| 0x2000 | Recent Departure Location | Gangnam-gu, Seoul | Recent Arrival Location | Ansan-si, Gyeonggi-do | Carbon Emission | 5L | Monthly Driving Distance | 840km |
| 0x3000 | Rearview Mirror Angle | 78° | Preferred Frequency | 91.9MHz | Seat Setting | 1 | Height of Steering Wheel | 3 |
| ⋮ | ⋮ | ⋮ | ⋮ | ⋮ | ⋮ | ⋮ | ⋮ | ⋮ |
| 0x6000 | Recent Departure Location | Hwaseong-si, Gyeonggi-do | Recent Arrival Location | Namyangju-si, Gyeonggi-do | Recent Driving Distance | 32km | - | - |

Figure 21:
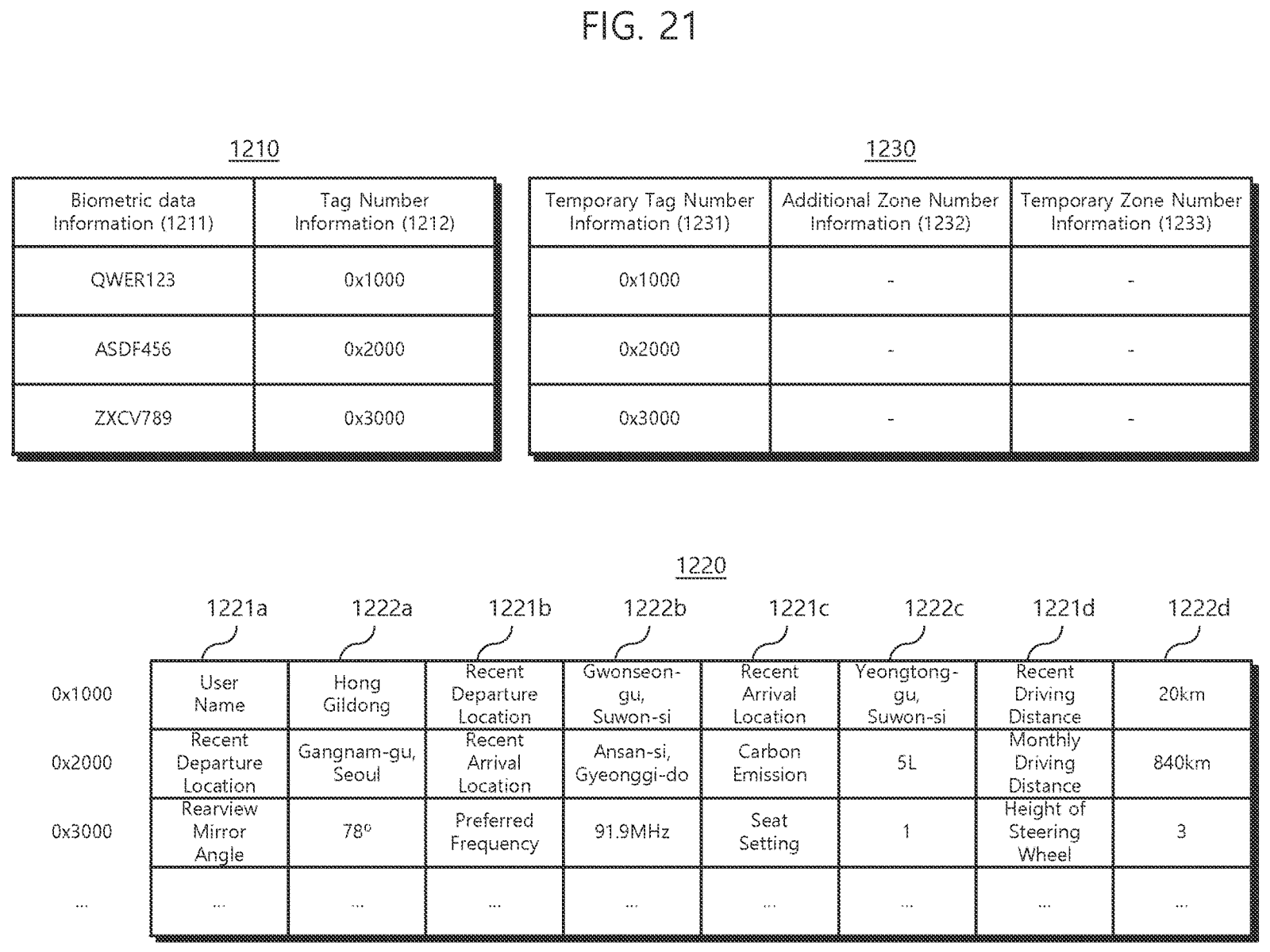

| Temporary Tag Number Information (1231) | Additional Zone Number Information (1232) | Temporary Zone Number Information (1233) |
|---|---|---|
| 0x1000 | - | - |
| 0x2000 | - | - |
| 0x3000 | - | - |

1210

| Biometric data Information (1211) | Tag Number Information (1212) |
|---|---|
| QWER123 | 0x1000 |
| ASDF456 | 0x2000 |
| ZXCV789 | 0x3000 |

1220

| | 1221a | 1222a | 1221b | 1222b | 1221c | 1222c | 1221d | 1222d |
|---|---|---|---|---|---|---|---|---|
| | User Name | Hong Gildong | Recent Departure Location | Gwonseon-gu, Suwon-si | Recent Arrival Location | Yeongtong-gu, Suwon-si | Recent Driving Distance | 20km |
| 0x1000 | Recent Departure Location | Gangnam-gu, Seoul | Recent Arrival Location | Ansan-si, Gyeonggi-do | Carbon Emission | 5L | Monthly Driving Distance | 840km |
| 0x2000 | Rearview Mirror Angle | 78° | Preferred Frequency | 91.9MHz | Seat Setting | 1 | Height of Steering Wheel | 3 |
| 0x3000 | ... | ... | ... | ... | ... | ... | ... | ... |
| ... | | | | | | | | |

| Biometric data Information (1211) | Tag Number Information (1212) |
|---|---|
| QWER123 | 0x1000 |
| ASDF456 | 0x2000 |
| ZXCV789 | 0x3000 |
| TYUI147 | 0x5000 |

1230

| Temporary Tag Number Information (1231) | Additional Zone Number Information (1232) | Temporary Zone Number Information (1233) |
|---|---|---|
| 0x1000 | - | - |
| 0x2000 | - | - |
| 0x3000 | - | - |
| 0x5000 | - | - |

1220

| | 1221a | 1222a | 1221b | 1222b | 1221c | 1222c | 1221d | 1222d |
|---|---|---|---|---|---|---|---|---|
| 0x1000 | User Name | Hong Gildong | Recent Departure Location | Gwonseon-gu, Suwon-si | Recent Arrival Location | Yeongtong-gu, Suwon-si | Recent Driving Distance | 20km |
| 0x2000 | Recent Departure Location | Gangnam-gu, Seoul | Recent Arrival Location | Ansan-si, Gyeonggi-do | Carbon Emission | 5L | Monthly Driving Distance | 840km |
| 0x3000 | Rearview Mirror Angle | 78° | Preferred Frequency | 91.9MHz | Seat Setting | 1 | Height of Steering Wheel | 3 |
| ... | ... | ... | ... | ... | ... | ... | ... | ... |
| 0x5000 | - | - | - | - | - | - | - | - |

Figure 23:
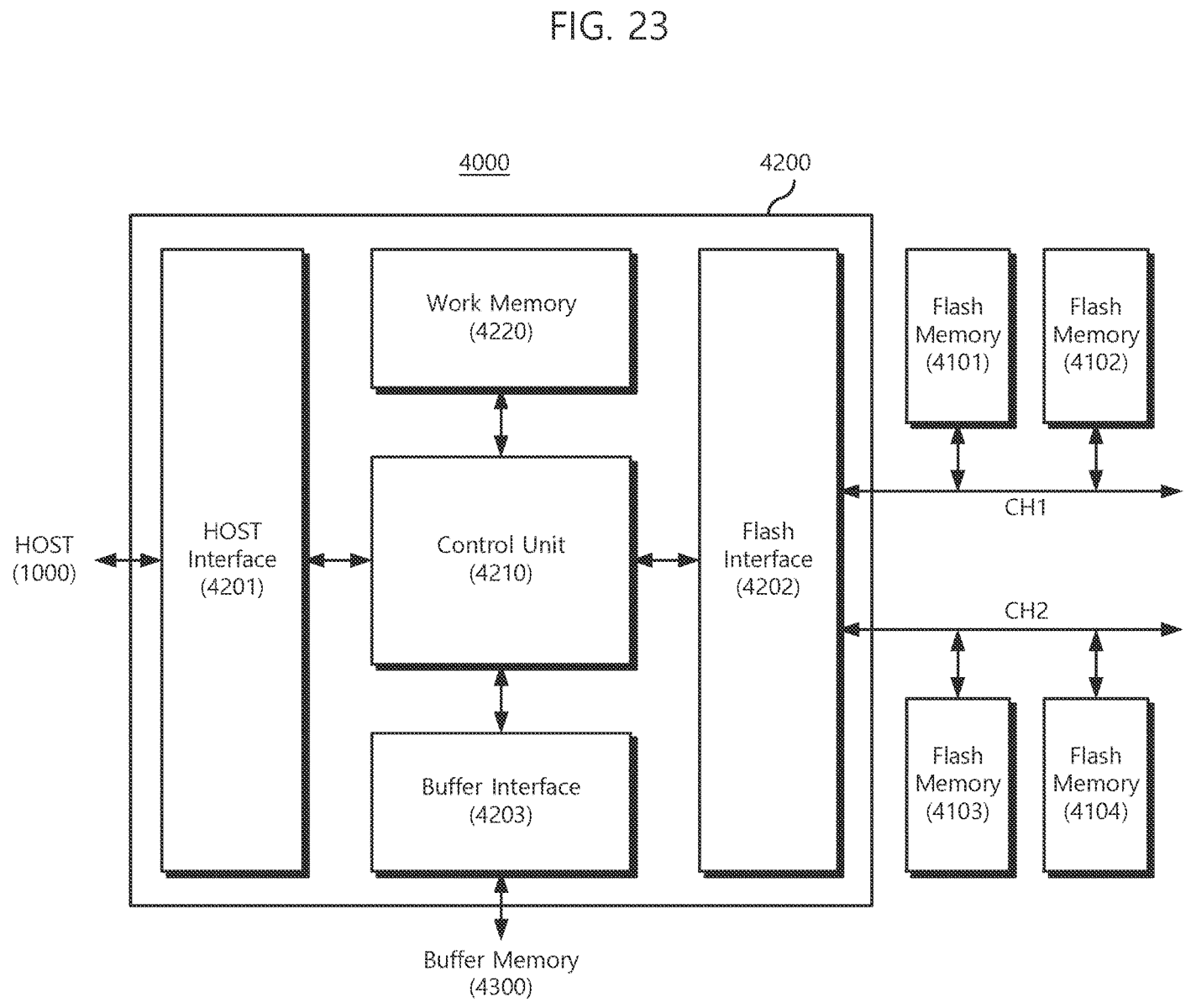

Flash Memory (4101)

Flash Memory (4102)

CH1

CH2

Flash Memory (4103)

Flash Memory (4104)

Flash Interface (4202)

Work Memory (4220)

Control Unit (4210)

Buffer Interface (4203)

Buffer Memory (4300)

HOST Interface (4201)

HOST (1000)

USER DATA MANAGEMENT SERVER MANAGING BIOMETRIC DATA FOR EACH DRIVER IN VEHICLE SHARING SYSTEM

CROSS-REFERENCE TO RELATED APPLICATION(S)

This application claims priority under 35 U.S.C. § 119 to Korean Patent Application No. 10-2023-0122680, filed on Sep. 14, 2023 in the Korean Intellectual Property Office, the disclosure of which is incorporated by reference herein in its entirety.

TECHNICAL FIELD

Example embodiments relate to a vehicle sharing system, and more particularly, to a user data management server managing biometric data for each driver of a shared vehicle.

DISCUSSION OF RELATED ART

Many car companies are researching autonomous driving technology. Autonomous driving technology may offer driving assistance functions (Level 0 to Level 2), and may perform autonomous driving functions (Level 3 to Level 5).

When the autonomous driving function is active, a vehicle may drive on the road without involvement of a driver. A Level 4 autonomous vehicle may drive on behalf of a driver in a situation of traffic congestion. In the case of a Level 4 autonomous vehicle, the vehicle may replace a driver in a limited area. In the case of a Level 5 autonomous vehicle, the vehicle may replace a driver regardless of areas. In the case of autonomous driving Level 4 or higher, it is expected that operating costs and carbon emissions will be reduced through efficient driving beyond replacement of drivers.

With the development of autonomous driving technology, car sharing businesses using vehicles with autonomous driving are increasing. When Level 4 or higher autonomous vehicles are shared, vehicles may be called remotely, which is effective in relieving parking difficulties.

In addition, users are able to register their user information on a shared vehicle, and may use an additional application or registered biometric information to use the shared vehicle. However, when a plurality of users use a single shared vehicle, a plurality of pieces of information are stored in a single storage device, causing a risk such as exposure of user information. In addition, it takes a large amount of time to load data when a plurality of pieces of user information are stored.

SUMMARY

Example embodiments provide a user data management server managing biometric data for each user in a car sharing system managing user data using tag numbers.

According to an example embodiment, a shared vehicle management server of a vehicle sharing system configured to allow a plurality of users to share and use a vehicle is provided. The shared vehicle management server includes an interface configured to receive biometric data from the plurality of users, a storage device configured to store the biometric data received through the interface, and a controller configured to assign a unique tag number to each of the plurality of users and to manage the biometric data of each of the plurality of users using the unique tag number. The controller is configured to store the biometric data of each of the plurality of users in a same storage area of the storage device using the unique tag number.

According to an example embodiment, a method of operating a shared vehicle management server includes receiving biometric data from a plurality of users, storing the received biometric data in a flash storage device, and assigning a unique tag number to each of the plurality of users and managing the assigned unique tag number. The biometric data of each of the plurality of users is stored in a same storage area using the unique tag number.

According to an example embodiment, a user data management server configured to use biometric information to provide vehicle sharing service includes an interface configured to receive biometric data and user data from a user, a storage device configured to store the biometric data, a tag number, and the user data received from the interface, and a controller configured to manage the user data using the biometric data and the tag number of the storage device. The storage device includes a basic information storage area configured to store the biometric data and the tag number, a user information storage area configured to store data identification information and user data information, and a temporary information storage area used to perform a migration operation. The user information storage area includes one or more blocks, the one or more blocks include one or more pages, and a write operation and a read operation are performed in units of a page and an erase operation is performed in units of a block.

BRIEF DESCRIPTION OF THE DRAWINGS

The above and other features of the present disclosure will become more apparent by describing in detail embodiments thereof with reference to the accompanying drawings.

FIG. 4 is a block diagram of a data storage device illustrated in FIG. 1, according to an example embodiment.

FIGS. 6 to 8 are diagrams illustrating an example of a method of operating a shared vehicle management server managing a shared vehicle illustrated in FIG. 2 for use by first to third users, according to an example embodiment.

FIG. 10 is a diagram illustrating the basic information storage, illustrated in FIG. 9, in the form of a table, according to an example embodiment.

FIG. 12 is a diagram illustrating the user information storage, illustrated in FIG. 11, in the form of a table, according to an example embodiment.

FIG. 14 is a diagram illustrating user information storage, illustrated in FIG. 13, in the form of a table, according to an example embodiment.

FIG. 15 is a diagram illustrating a relationship between basic information storage and user information storage, according to an example embodiment.

FIG. 17 is a diagram illustrating basic information storage, user information storage, and temporary information storage in operation S171 illustrated in FIG. 16, according to an example embodiment.

FIG. 18 is a diagram illustrating basic information storage, user information storage, and temporary information storage in operation S172 illustrated in FIG. 16, according to an example embodiment.

FIG. 19 is a diagram illustrating basic information storage, user information storage, and temporary information storage in operation S172 illustrated in FIG. 16, according to an example embodiment.

FIG. 20 is a diagram illustrating basic information storage, user information storage, and temporary information storage in operation S173 illustrated in FIG. 15, according to an example embodiment.

FIG. 21 is a diagram illustrating basic information storage, user information storage, and temporary information storage in operation S174 illustrated in FIG. 15, according to an example embodiment.

FIG. 22 is a diagram illustrating basic information storage, user information storage, and temporary information storage in operation S175 illustrated in FIG. 16, according to an example embodiment.

FIG. 23 is a block diagram illustrating an example in which a data storage device illustrated in FIG. 1 is implemented as a solid state drive (SSD), according to an example embodiment.

DETAILED DESCRIPTION

Figure 1:
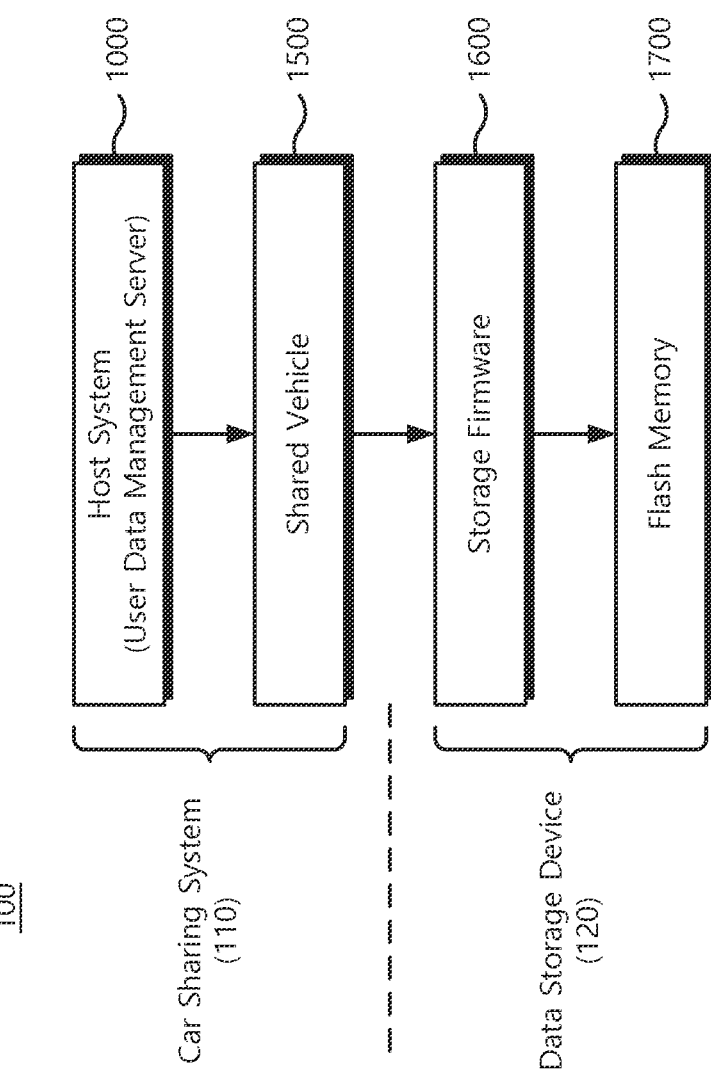
FIG. 1 is a block diagram of a vehicle sharing management system, according to an example embodiment.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an example embodiment may be described as a "second" element in another example embodiment.

It should be understood that descriptions of features or aspects within each example embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise. FIG. 1 is a block diagram of a vehicle sharing management system, according to an example embodiment.

Referring to FIG. 1, a vehicle sharing management system 100 may include a vehicle sharing system 110 and a data storage device 120.

The vehicle sharing system 110 may include a host system 1000 and a shared vehicle 1500 (e.g., a shared car). The host system 1000 may refer to a user data management server. The user data management server 1000 may register or delete biometric information for each driver. Alternatively, the user data management server 1000 may manage a driver's biometric information for each vehicle.

The shared vehicle 1500 may be shared and used by a plurality of users. The shared vehicle 1500 is allowed to be driven only by users who have registered their biometric information.

The data storage device 120 may include various types of storage media. FIG. 1 illustrates an example of a flash storage device. In FIG. 1, the flash storage device may include storage firmware 1600 and a flash memory 1700. The storage firmware 1600 may assign a single tag number to each biometric information. The storage firmware 1600 may manage data to be stored in the same block or zone of the flash memory 1700 for each tag number.

Figure 2:
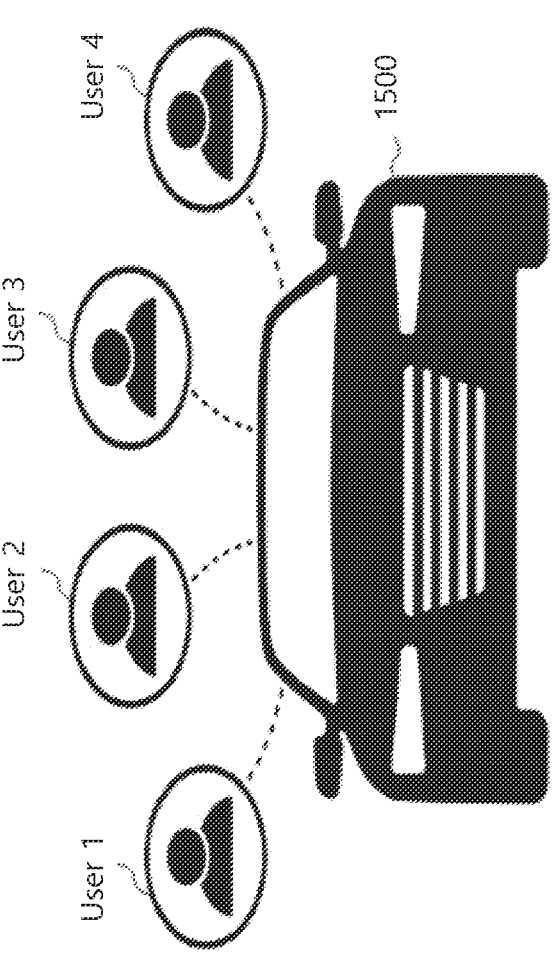
FIG. 2 is a reference diagram illustrating a relationship between a shared vehicle and a user illustrated in FIG. 1, according to an example embodiment.

FIG. 2 is a reference diagram illustrating a relationship between the shared vehicle and the user illustrated in FIG. 1, according to an example embodiment.

Referring to FIG. 2, the shared vehicle 1500 may be used by a plurality of users Users1 to User4. The shared vehicle 1500 may store a plurality of pieces of user information, and users may use the shared vehicle 1500 through their user information.

The plurality of pieces of user information are stored in the shared vehicle 1500. According to example embodiments, the user data management server 1000 may safely manage and protect the user information, and the user data management server 1000 may manage the data storage device 120 to rapidly fetch stored user information.

The user data management server 1000 may build big data by collecting user information using the shared vehicle 1500 and systematizing the collected user information. The built big data may improve efficiency of use of the shared vehicle 1500 through machine learning technology.

Figure 3:
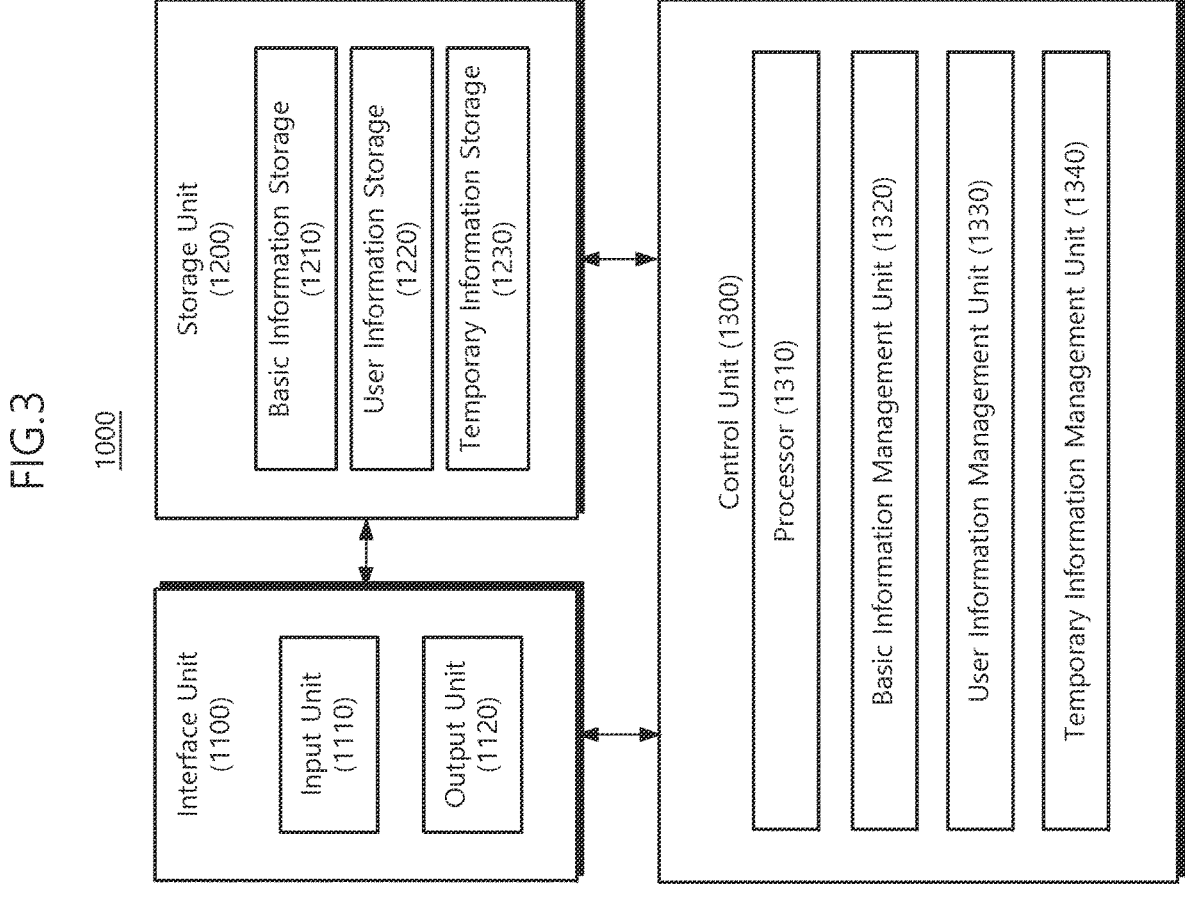
FIG. 3 is a block diagram illustrating an example of a user data management server illustrated in FIG. 1, according to an example embodiment.

FIG. 3 is a block diagram illustrating an example of the user data management server illustrated in FIG. 1, according to an example embodiment.

Referring to FIG. 3, the user data management server 1000 may include an interface unit 1100, a storage unit 1200, and a control unit 1300.

The user data management server 1000 may receive user information from a user of the shared vehicle 1500, and may automatically store the received user information in a database. Alternatively, the user data management server 1000 may automatically calculate basic information on the use of the shared vehicle 1500 in response to a user's information request, or may provide information on the user of a vehicle to a user who previously requested the information.

The interface unit 1100 may be used to input, for example, letters, numbers, biometric data, or the like, from the user, or to provide information or content to the user. The user may input user information using the interface unit 1100 and receive services for using a shared vehicle. The interface unit 1100 may include an input unit 1110 and an output unit 1120. The interface unit 1100 may also be referred to as an interface or an interface circuit. The input unit 1110 may also be referred to as an input interface or an interface circuit. The output unit 1120 may also be referred to as an output interface or an output interface circuit.

The input unit 1110 may receive information utilized to use a shared vehicle from the user. The input unit 1110 may receive a user's biometric data. The term "biometric data" refers to information on, for example, a person's physical, physiological, and behavioral characteristics such as, for example, fingerprints, faces, irises, veins, voice, handwriting, or the like. The input unit 1110 may receive biometric data through, for example, a fingerprint recognition device, a facial recognition device, a vein recognition device, an iris recognition device, a voice recognition device, a handwriting recognition device, or the like.

The input unit 1110 may receive information, other than the biometric data, from the user. To this end, the input unit 1110 may be connected to an internal input device, such as, for example, an on-screen keyboard, or an external input device (for example, a keyboard, an electronic pen, or the like) using, for example, a wire or Bluetooth.

The output unit 1120 may output information utilized for a user to use a shared vehicle. To do this, the output unit 1120 may include a video output device such as, for example, a monitor or an audio output device such as a speaker.

The storage unit 1200 may store information utilized to use and manage the shared vehicle. The storage unit 1200 may store the biometric data and the user information received from the input unit 1110 and may include a basic information storage 1210 (also referred to as a basic information storage area), a user information storage 1220 (also referred to as a user information storage area), and a temporary information storage 1230 (also referred to as a temporary information storage area). The storage unit 1200 may also be referred to as a storage device.

The basic information storage 1210 may store biometric data and a tag number uniquely associated with the biometric data. Data identification information and user data may be stored in the user information storage 1220. Data identification information may be information utilized to identify what the corresponding user data is about. The temporary information storage 1230 may store memory address information for a migration operation, which will be described further below.

The control unit 1300 may include a processor 1310, a basic information management unit 1320, a user information management unit 1330, and a temporary information management unit 1340. The control unit 1300 may be implemented as hardware or software. For example, the processor 1310 may be implemented as hardware, and the basic information management unit 1320, the user information management unit 1330, and the temporary information management unit 1340 may be implemented as algorithms or software.

The processor 1310 may control the overall operation of the user data management server 1000. For example, the processor 1310 may operate the control unit 1300 by accessing the basic information storage 1210, the user information storage 1220, and the temporary information storage 1230 of the storage unit 1200, and by executing algorithms or program instructions constituting the basic information management unit 1320, the user information management unit 1330, and the temporary information management unit 1340. The control unit 1300 may also be referred to as a controller or a control circuit.

In addition, the processor 1310 may include, for example, controllers, interfaces, graphics engines, or the like, which may control various components of the user data management server 1000. The processor 1310 may be provided in the form of, for example, a system-on-chip (SoC), an application specific integrated circuit (ASIC), a field programmable gate array (FPGA), an SSD controller, or the like.

The basic information management unit 1320 may access the basic information storage 1210 of the storage unit 1200 to manage the user's biometric data and the tag number. The basic information management unit 1320 will be described below with reference to FIGS. 9 and 10.

The user information management unit 1330 may manage data of at least one user by accessing the user information storage 1220 of the storage unit 1200. The user information management unit 1330 will be described below with reference to FIGS. 11 and 12.

The temporary information management unit 1340 may temporarily manage user information by accessing the temporary information storage 1230 of the storage unit 1200. The temporary information management unit 1340 will be described below with reference to FIGS. 13 and 14.

Figure 4:
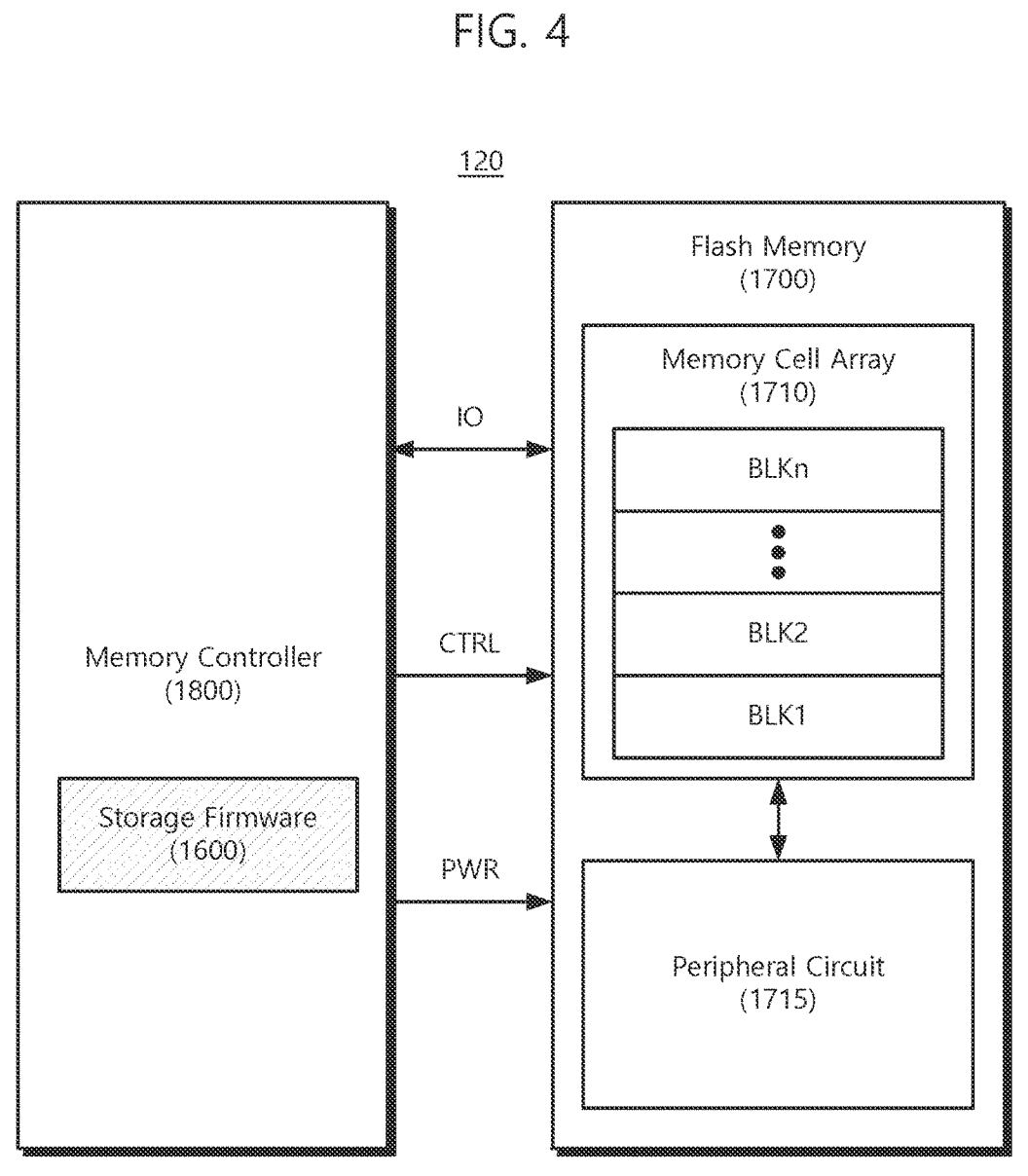

FIG. 4 is a block diagram of the data storage device 120 illustrated in FIG. 1, according to an example embodiment.

Referring to FIG. 4, the data storage device 120 may include a flash memory 1700 and a memory controller 1800.

The flash memory 1700 may receive input/output signals IO from the memory controller 1800 through input/output lines, receive control signals CTRL through control lines, and receive external power supply PWR through power lines. The storage device 120 may store data in the flash memory 1700 under the control of the memory controller 1800.

The flash memory 1700 may include a memory cell array 1710 and a peripheral circuit 1715. The memory cell array 1710 may have a planar (2D) structure or a vertical (3D) structure. The memory cell array 1710 may include a plurality of memory cells. Single-bit data or multi-bit data may be stored in each memory cell.

The memory cell array 1710 may be disposed next to or above the peripheral circuit 1115 in terms of the design layout structure. A structure, in which the memory cell array 1710 is disposed above the peripheral circuit 1115, may be referred to as a cell-on-peripheral (COP) structure. The memory cell array 1710 may be manufactured as a chip, separate from the peripheral circuit 1715. An upper chip including the memory cell array 1710 and a lower chip including the peripheral circuit 1715 may be connected to each other by a bonding method. Such a structure may be referred to as a chip-to-chip (C2C) structure.

The peripheral circuit 1715 may include analog circuits and/or digital circuits utilized to store data in the memory cell array 1710 or read data stored in the memory cell array 1710. The peripheral circuit 1715 may receive the external power PWR through power lines and generate internal power of various levels.

The peripheral circuit 1715 may receive commands, addresses, and/or data from the memory controller 1800 through input/output lines. The peripheral circuit 1715 may store data in the memory cell array 1710 according to the control signals CTRL. Alternatively or additionally, the peripheral circuit 1715 may read data stored in the memory cell array 1710 and provide the read data to the memory controller 1800.

Figure 5:
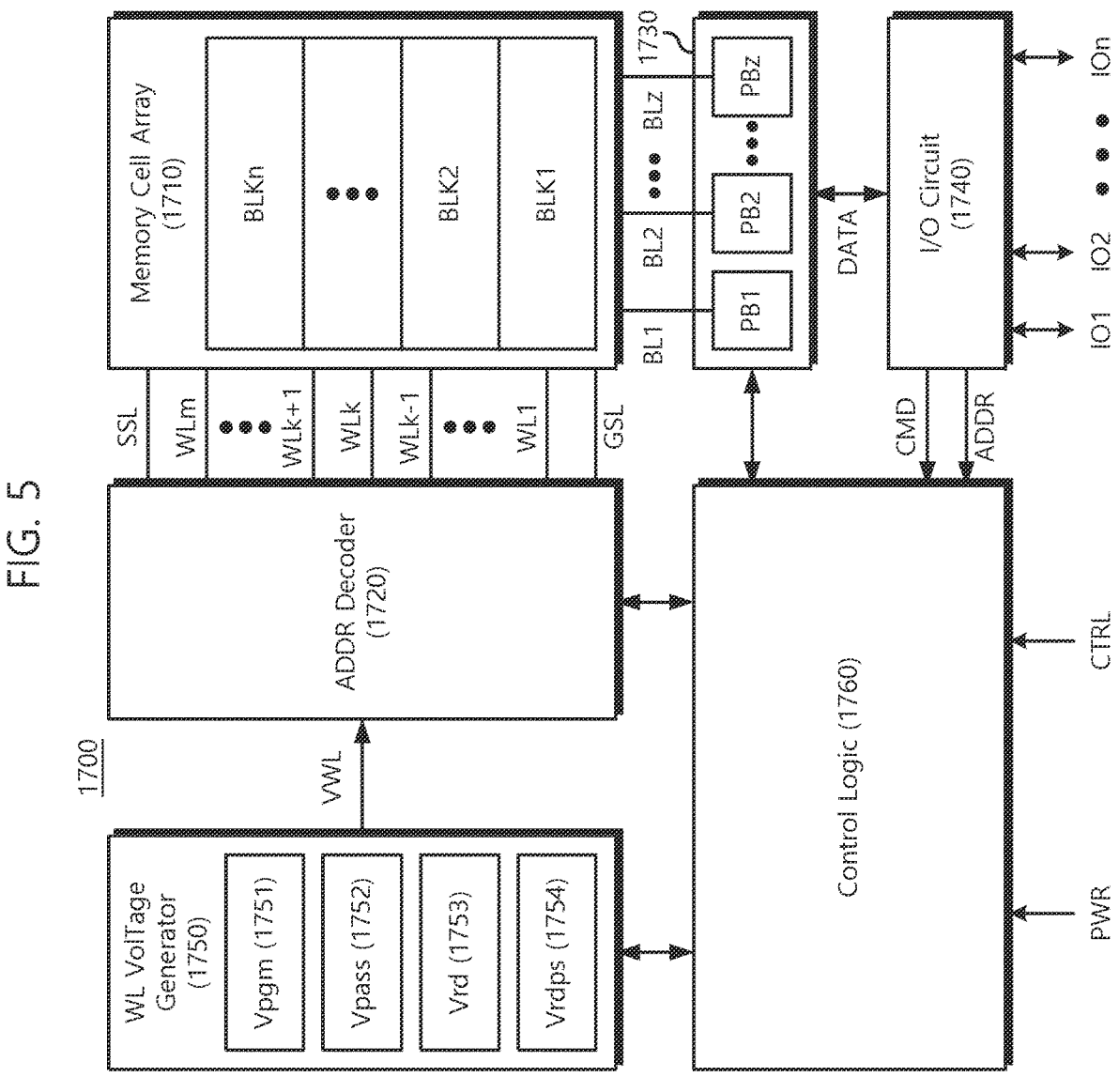
FIG. 5 is a block diagram of a flash memory illustrated in FIG. 4, according to an example embodiment.

FIG. 5 is a block diagram of the flash memory 1700 illustrated in FIG. 4, according to an example embodiment.

Referring to FIG. 5, the flash memory 1700 may include the memory cell array 1710 and the peripheral circuit 1715. The peripheral circuit 1715 may include an address decoder 1720, a page buffer circuit 1730, a data input/output circuit 1740, a wordline voltage generator 1750, and a control logic 1760.

The memory cell array 1710 may include a plurality of memory blocks BLK1 to BLKn, where n is a positive integer. Each memory block may include a plurality of pages. Each page may include a plurality of memory cells. Each memory cell may store multi-bit data. Each memory block may correspond to an erase unit, and each page may correspond to a read and/or write unit.

The memory cell array 1710 may be formed in a direction substantially perpendicular to a substrate. A gate electrode layer and an insulating layer may be alternately deposited on the substrate. Each memory block (for example, BLK1) may be connected to one or more string select lines SSL, a plurality of wordlines WL1 to WLm, and one or more ground select lines GSL. WLk is a selected wordline sWL, and the remaining wordlines WL1 to WLk−1 and WLk+1 to WLm are unselected wordlines uWL, where each of m and k is a positive integer.

The address decoder 1720 may be connected to the memory cell array 1710 through the select lines SSL and GSL and the wordlines WL1 to WLm. The address decoder 1720 may select a wordline during a program or read operation. The address decoder 1720 may receive a wordline voltage VWL from the wordline voltage generator 1150 and provide a program voltage or a read voltage to the selected wordline.

The page buffer circuit 1730 may be connected to the memory cell array 1710 through bitlines BL1 to BLz, where z is a positive integer. The page buffer circuit 1130 may temporarily store data to be stored in the memory cell array 1710 or data read from the memory cell array 1710. The page buffer circuit 1730 may include page buffers PB1 to PBz connected to respective bitlines. Each page buffer may include a plurality of latches to store or read multi-bit data.

The input/output circuit 1740 may be internally connected to the page buffer circuit 1730 through data lines and externally connected to the memory controller 1800 (see FIG. 4) through input/output lines IO1 to Ion, where n is a positive integer. The input/output circuit 1740 may receive program data from the memory controller 1800 during a program operation. Also, the input/output circuit 1740 may provide data, read from the memory cell array 1710, to the memory controller 1800 during a read operation.

The wordline voltage generator 1750 may receive internal power from the control logic 1760 and generate a wordline voltage VWL utilized to read or write data. The wordline voltage VWL may be provided to a selected wordline sWL or unselected wordlines uWL through the address decoder 1720.

The wordline voltage generator 1750 may include a program voltage generator (Vpgm generator) 1751 and a pass voltage generator (Vpass generator) 1752. The program voltage generator 1751 may generate a program voltage Vpgm, provided to the selected wordline sWL, during a program operation. The pass voltage generator 1752 may generate a pass voltage Vpass provided to the selected wordline sWL and the unselected wordlines uWL.

The wordline voltage generator 1750 may include a read voltage generator (Vrd generator) 1753 and a read pass voltage generator (Vrdps generator) 1754. The read voltage generator 1753 may generate a select read voltage Vrd, provided to the selected wordline sWL, during a read operation. The read pass voltage generator 1154 may generate a read pass voltage Vrdps provided to unselected wordlines uWL. The read pass voltage Vrdps may be a voltage sufficient to turn on memory cells connected to the unselected wordlines uWL during a read operation.

The control logic 1760 may control operations such as read, write, and erase operations of the flash memory 1700 using commands CMD, addresses ADDR, and control signals CTRL provided from the memory controller 1800. The addresses ADDR may include a block select address for selecting a single memory block, a row address for selecting a single page, and a column address for selecting a single memory cell.

Figure 6:
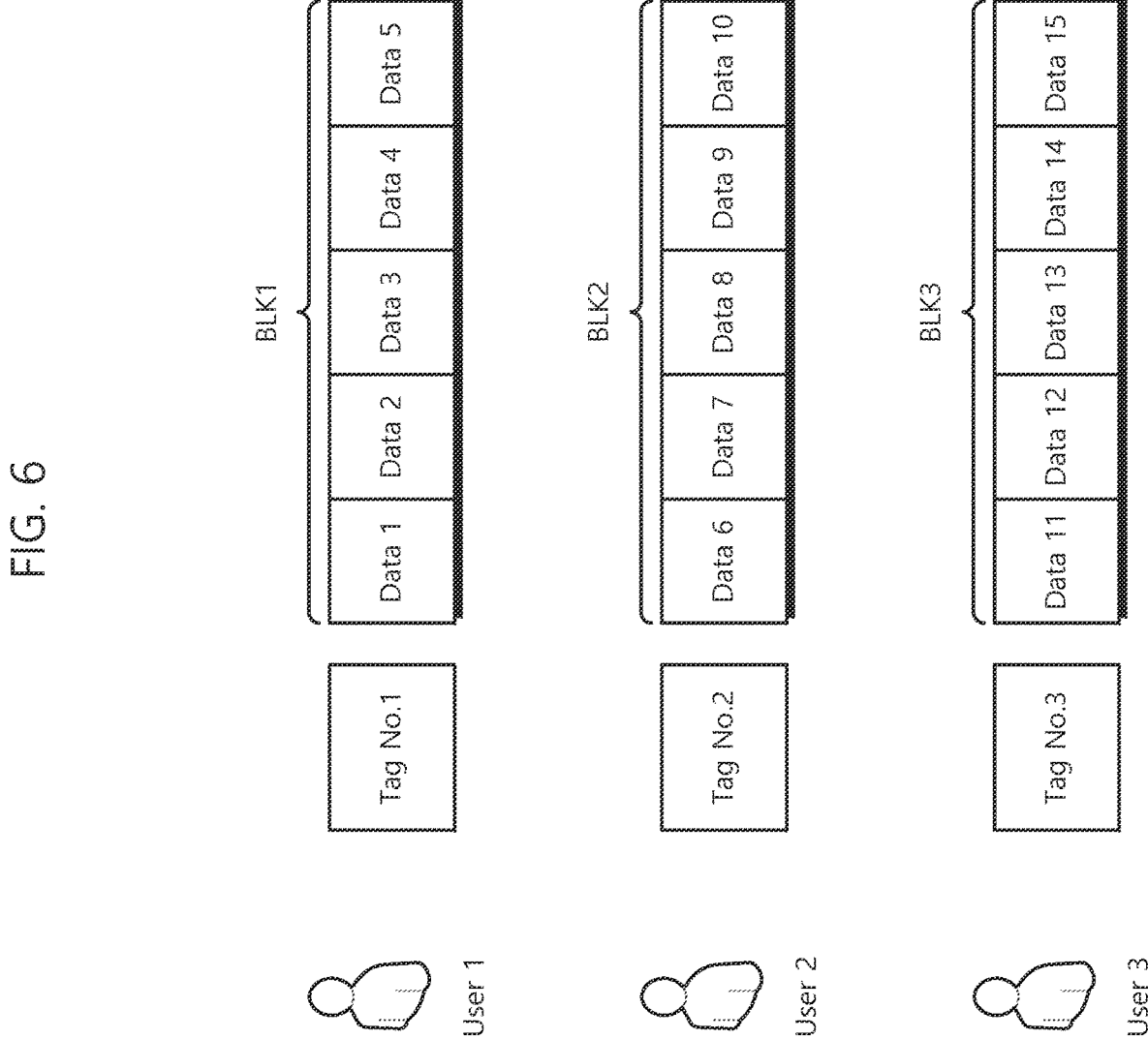
Figure 8:
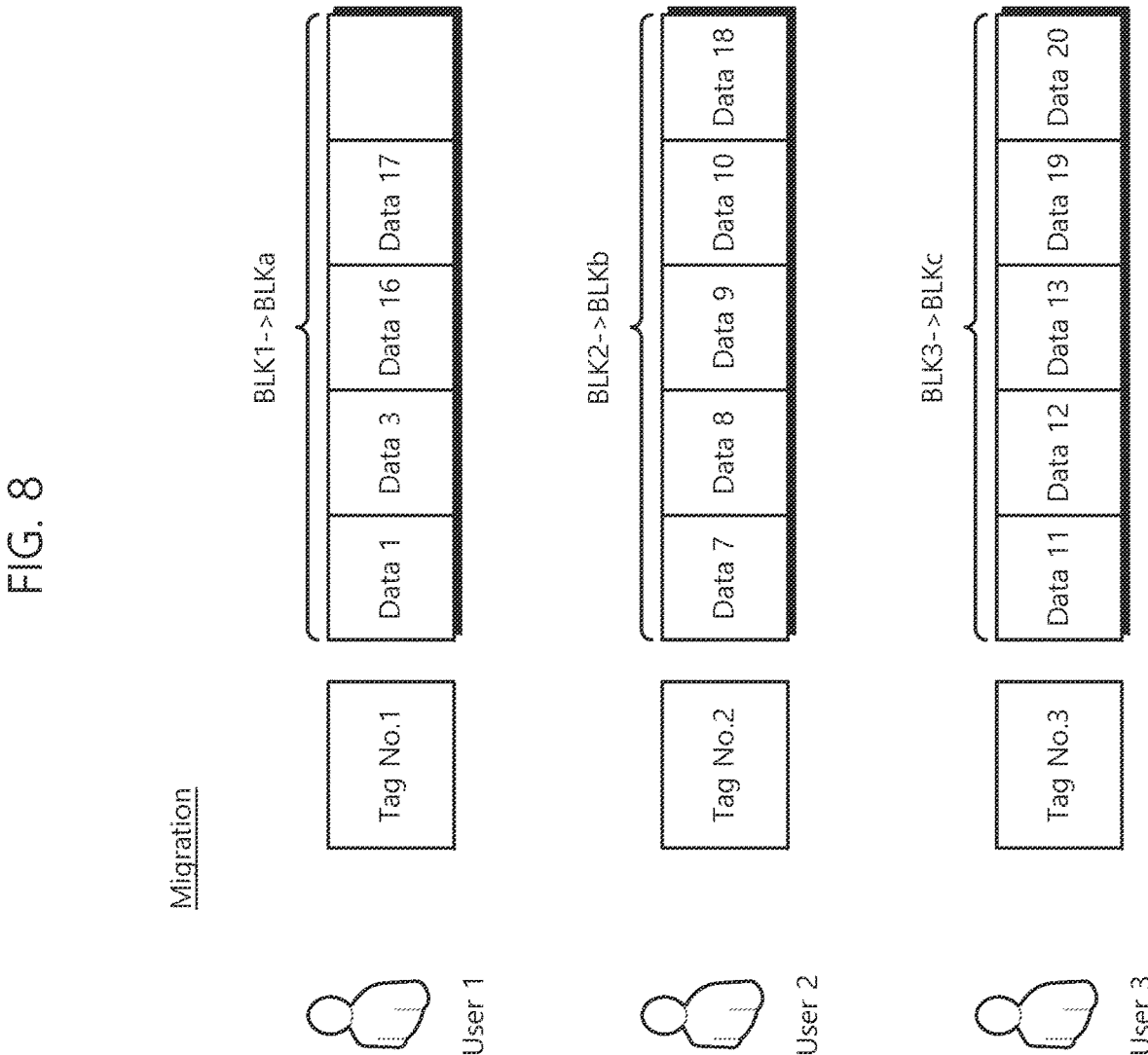

FIGS. 6 to 8 are diagrams illustrating an example of a method of operating a shared vehicle management server managing a shared vehicle illustrated in FIG. 2 for use by first to third users, according to an example embodiment.

Referring to FIG. 6, for each user of the shared vehicle 1500, a tag number may be assigned and biometric information may be managed. The tag number for each user may be stored in a spare area of a corresponding memory block. The spare area refers to a remaining area, other than a main area in which user data is stored.

A first tag number may be assigned to the first user, and first biometric number to fifth biometric data may be stored in a first memory block BLK1. A second tag number may be assigned to the second user, and sixth biometric data to tenth biometric data may be stored in a second memory block BLK2. A third tag number may be assigned to the third user, and eleventh biometric number to fifteenth biometric data may be stored in a third memory block BLK3.

Referring to FIG. 7, the second, fourth, and fifth biometric data of the first user may each be no longer valid, for example, may be invalid data. Sixteenth biometric data and seventeenth biometric data may be newly input. Sixth biometric data of the second user may be invalid data, and eighteenth biometric data may be newly input. Fourteenth and fifteenth biometric data of the third user may be invalid data, and nineteenth and twentieth biometric data may be newly input.

The newly input sixteenth to twentieth biometric data may be stored in a flash memory 1700 or in an external buffer memory. The buffer memory may be a nonvolatile memory such as, for example, a flash memory, or a volatile memory such as a dynamic random access memory (DRAM).

Referring to FIG. 8, the flash memory 1700 does not support an overwrite operation, so that the valid biometric data DATA1 and DATA3 and the newly input biometric data DATA16 and DATA17 in the first memory block BLK1 may migrate to a new memory block BLKa. The valid biometric data DATA7 to DATA10 and the newly input biometric data DATA18 in the second memory block BLK2 may migrate to a new memory block BLKb. The valid biometric data DATA11 to DATA13 and newly input biometric data DATA19 and DATA20 in the third memory block BLK3 may migrate to a new memory block BLKc.

The shared vehicle management server 1000 may register biometric information for each driver of the shared vehicle 1500, and may then assign a single tag number for each driver. The shared vehicle management server 1000 may store a user's biometric data in the same storage area for the same tag number. The same storage area may be one or more memory blocks.

The shared vehicle management server 1000 may manage the user's biometric information in the same area, thereby improving read performance during driving of a shared vehicle and enhancing the security of personal biometric data. The shared vehicle management server 1000 manages biometric data for each user, allowing the biometric data to be easily managed with big data.

Figure 9:
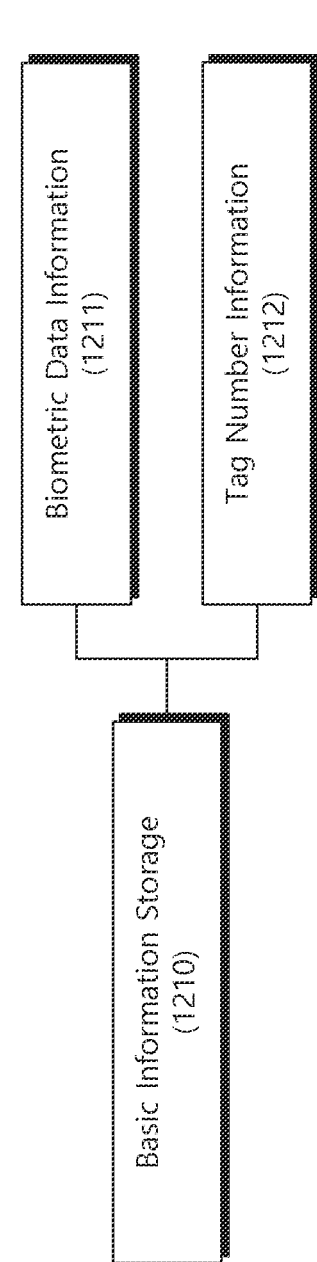
FIG. 9 is a diagram illustrating an example of basic information storage illustrated in FIG. 3, according to an example embodiment.

FIG. 9 is a diagram illustrating an example of the basic information storage illustrated in FIG. 3, according to an example embodiment. FIG. 10 is a diagram illustrating the basic information storage, illustrated in FIG. 9, in the form of a table, according to an example embodiment.

Referring to FIGS. 9 and 10, biometric data information 1211 and tag number information 1212 may be stored in the basic information storage 1210.

Biometric data of a user may be stored in the biometric data information 1211. Biometric data is information representing physical characteristics used to identify a user. The physical characteristics may include, for example, fingerprints, faces, irises, veins, voice, handwriting, or the like. When physical characteristics of a user are input, the basic information management unit 1320 may convert the physical characteristics into digital data and store the converted digital data in the biometric data information 1211. In addition, the basic information management unit 1320 may encrypt biometric data and store the biometric data in biometric data information 1211.

Referring to FIG. 10, when physical characteristics of a user A are input, the basic information management unit 1320 may convert the physical characteristics into QWER123 to generate biometric data. The basic information management unit 1320 may store the generated biometric data in biometric data information 1211. The basic information management unit 1320 may generate ASDF456 as biometric data on physical characteristics of a user B, and may generate ZXCV789 as biometric data on physical characteristic of a user C. In addition, ASDF456 and ZXCV789 may be stored in the biometric data information 1211 of the basic information storage 1210.

A tag number may be stored in the tag number information 1212. The tag number may be a digital value assigned based on biometric data. Only a single tag number may be assigned to a single piece of biometric data. Since the tag number may be a unique value in the tag number information 1212, the tag number may be used as an identification number.

The tag number may be an address value indicating a specific location in the storage unit 1200. For example, the tag number may be an address value specifying a specific location of the user information storage 1220. The specific location may be an address indicating a location of a specific block, a specific page, or a specific zone. The block, page, or zone refers to a range of data that can be read at once. Accordingly, all user data may be read at once through the tag number. As a result, the basic information management unit 1320 may designate a tag number in the area range of the user information storage 1220.

The basic information management unit 1320 may sequentially or randomly assign tag numbers based on the input order of biometric data. Additionally, the basic information management unit 1320 may generate a tag number through a specific algorithm using biometric data as an input value. As an example, the basic information management unit 1320 may receive biometric data and generate an output value through a hash.

Referring to FIG. 10, biometric data of the user A may be QWER123, and 0x1000 may be assigned as a tag number of the user A. In addition, 0x2000 may be assigned as a tag number of the user B, and 0x3000 may be assigned as a tag number of the user C.

Figure 11:
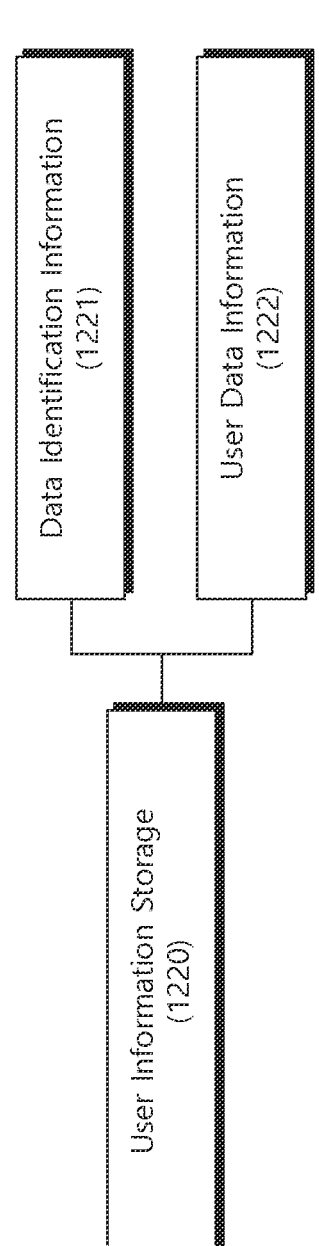
FIG. 11 is a diagram illustrating an example of user information storage illustrated in FIG. 3, according to an example embodiment.

FIG. 11 is a diagram illustrating an example of the user information storage illustrated in FIG. 3, according to an example embodiment. FIG. 12 is a diagram illustrating the user information storage, illustrated in FIG. 11, in the form of a table, according to an example embodiment.

Referring to FIGS. 11 and 12, data identification information 1221 and user data information 1222 may be stored in the user information storage 1220.

Information for identifying user data information 1222 may be stored in the data identification information 1221. Data generated by a user may be stored in the user data information 1222. The user information management unit 1330 may store data identification information 1221 and user data information 1222 as a pair. In addition, the user information management unit 1330 may continuously store the pair of data identification information 1221 and user data information 1222.

Referring to FIG. 12, when Hong Gildong is input as a name of the user A, the user information management unit 1330 may store a user name in the data identification information 1221, and may store Hong Gildong in the user data information 1222. In addition, the user information management unit 1330 may continuously store recent vehicle use history of the user A. As an example, the vehicle use history may include Gwonseon-gu, Suwon-si 1222b that is a recent departure location 1221b, Yeongtong-gu, Suwon-si 1222c that is a recent arrival location 1221c, and 20 km 1222d that is a recent driving distance 1221d.

The user information management unit 1330 may store a plurality of pieces of information, related to a single piece of biometric data, in a single page or a single block. The user information management unit 1330 may read all of the user information, related to the single piece of biometric data, with a single read operation. Accordingly, the user information management unit 1330 may decrease the number of accesses to the flash storage device. In addition, the user information management unit 1330 may rapidly perform a read operation.

Figure 13:
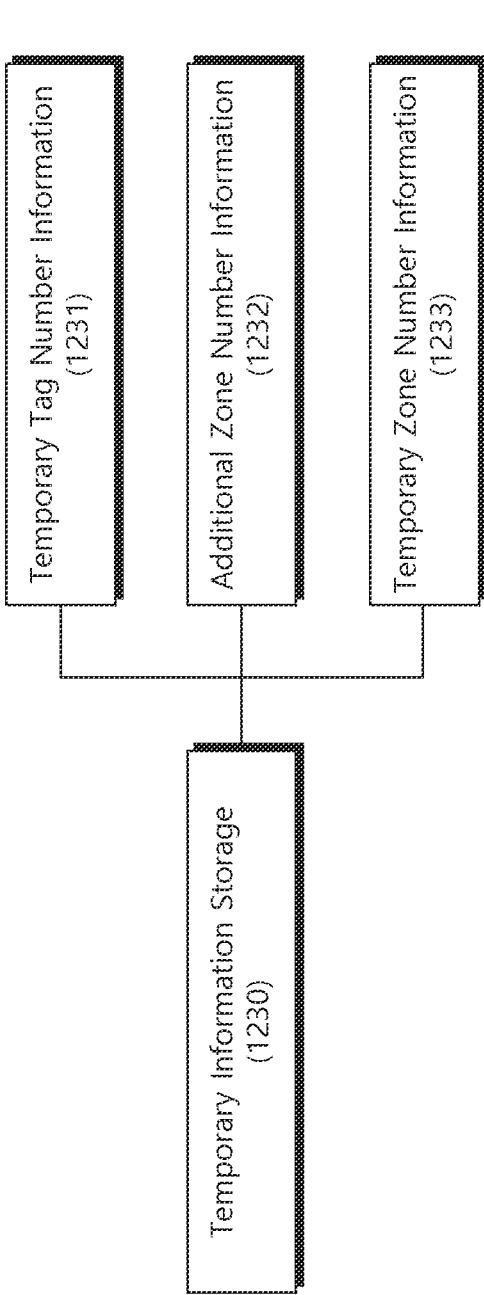
FIG. 13 is a diagram illustrating an example of temporary information storage illustrated in FIG. 3, according to an example embodiment.

FIG. 13 is a diagram illustrating an example of the temporary information storage illustrated in FIG. 3, according to an example embodiment. FIG. 14 is a diagram illustrating the user information storage, illustrated in FIG. 13, in the form of a table, according to an example embodiment.

Referring to FIGS. 13 and 14, temporary tag number information 1231, additional zone number information 1232, and temporary zone number information 1233 may be stored in the temporary information storage 1230.

The same data as the tag number information 1212 of the basic information storage 1210 may be stored in the temporary tag number information 1231. The additional zone number information 1232 may store information on a location in which new information is stored when new information is input for the same biometric information. The temporary zone number information 1233 may store information on a location in which migration information is stored when migration operation to be described later is performed.

Example embodiments of the temporary information storage 1230 and the temporary information management unit 1340 will be described below with reference to FIGS. 17, 18, and 19.

FIG. 15 is a diagram illustrating a relationship between the basic information storage 1210 and the user information storage 1220, according to an example embodiment.

Referring to FIG. 15, tag number information 1212 of the basic information storage 1210 may indicate a specific location of the user information storage 1220.

In the basic information storage 1210, a tag number of biometric data QWER123 is 0x1000, and the tag number 0x1000 represents an address value 0x1000 of the user data information 1222. An access to the user data information 1222 may be performed through a tag number, which is available only when biometric data is present.

Biometric data may serve as a key to find a tag number. The biometric data is user-dependent information, so that users may only access their own user information. Accordingly, the security of user data may be enhanced. In addition, when the tag number is found, an immediate access to a location in which the user data is stored may be performed. Thus, the user data may be rapidly read.

Figure 16:
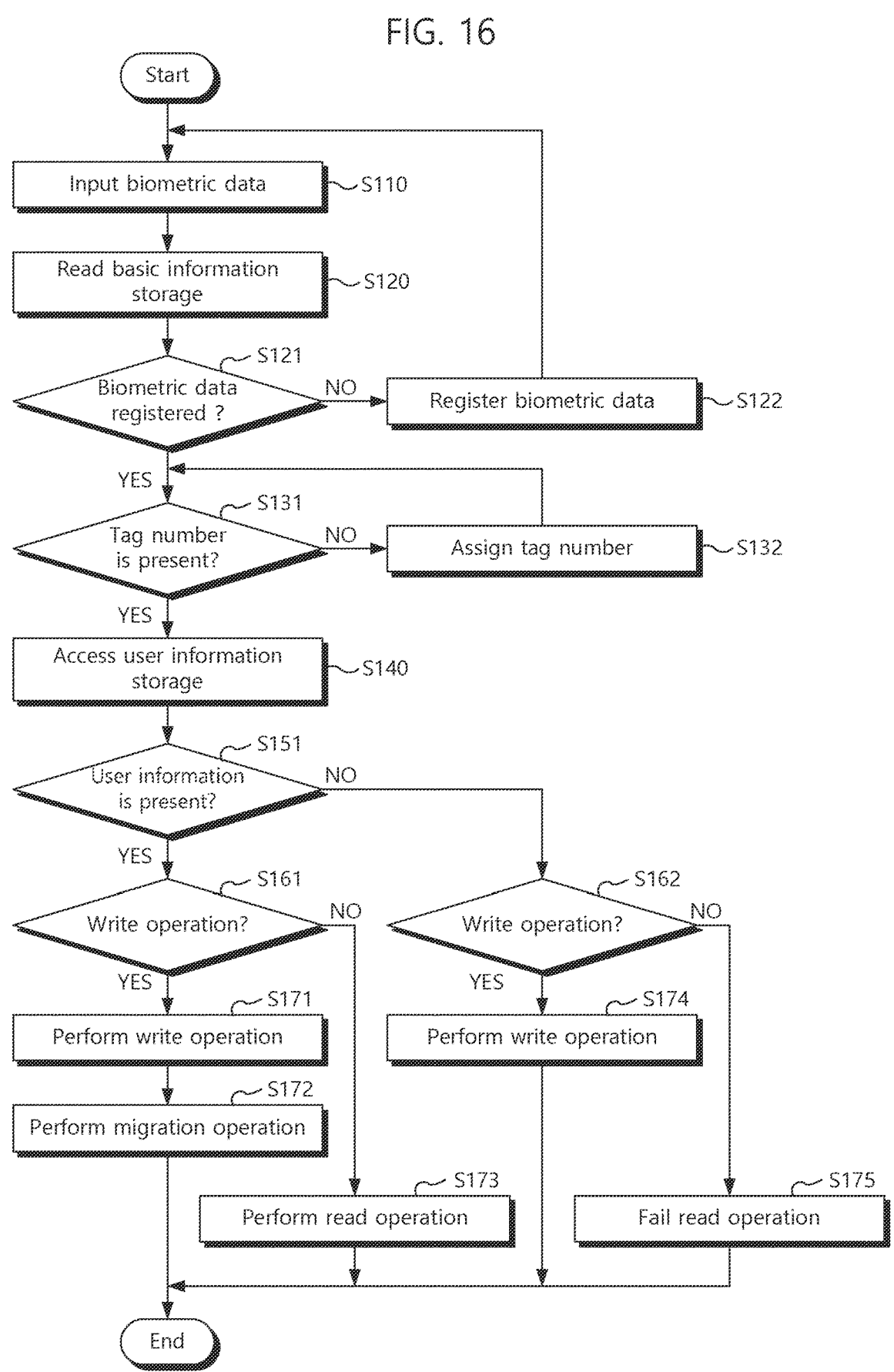
FIG. 16 is a flowchart illustrating a method of operating a user data management server illustrated in FIG. 1, according to an example embodiment.

FIG. 16 is a flowchart illustrating a method of operating the user data management server illustrated in FIG. 1, according to an example embodiment.

Referring to FIGS. 15 and 16, the user data management server 1000 may perform read and write operation on data stored in the basic information storage 1210, user information storage 1220, and temporary information storage 1230.

In operation S110, a user may input biometric data, such as, for example, fingerprint, face, iris, vein, voice, or handwriting, through the input unit 1110. In addition, the user may input user information such as a name. An example will be provided in which a user A with a biometric data value of QWER123 and a user D with a biometric data value of TYUI147 input biometric data.

In operation S120, the user data management server 1000 may read biometric data information 1211 and the tag number information 1212 from the basic information storage 1210. It can be seen that QWER123, ASDF456, and ZXCV789 have been registered in the user data management server 1000.

In operation S121, the user data management server 1000 may determine whether the biometric data input in operation S110 is registered in the biometric data information 1211 read in operation S120. As an example, QWER123 of the user A may match a first value of the biometric data information 1211, so that the user data management server 1000 may determine that QWER123 has been registered (YES). In addition, TYUI147 of the user D is not present in the biometric data information 1211, and thus, the user data management server 1000 may determine that the user D is an unregistered user (NO).

When the user data management server 1000 determines that the user is an unregistered user (NO), the process proceeds to S122 in which biometric data authentication is determined to fail and registration of biometric data may be guided (e.g., biometric data may be registered). When biometric data is registered, the user data management server 1000 may store the biometric data in biometric data information 1211 of the basic information storage 1210. Accordingly, TYUI147 of the user D may be stored in the biometric data information 1211.

When the user data management server 1000 determines that the user is a registered user (YES), a determination may be made as to whether the tag number is present.

In operation S131, the user data management server 1000 may determine whether tag number information corresponding to the biometric data information 1211 is present. As an example, only biometric data of the user D is stored and the tag number of the user D is not present, and thus, the user data management server 1000 may determine that the tag number is not present (NO). When the user data management server 1000 determines that the tag number is not present (NO), the process proceeds to S132 in which a tag number is assigned, and the assigned tag number may be stored in the tag number information 1212.

Since the tag number 0x1000 of the user A is present, the user data management server 1000 determines that the tag number exists (YES), and the process proceeds to S140 to access the user information storage 1220.

In operation S140, the user data management server 1000 may read the user information storage 1220 based on the tag number.

As an example, in the case of the user A, the user data management server 1000 may access a zone with the address value of 0x1000 in the user information storage 1220 based on the tag number 0x1000. In the case of the user D, the user data management server 1000 may access the user information storage 1220 based on a newly assigned tag number.

In operation S151, the user data management server 1000 may determine whether user information including data identification information 1221 and user data information 1222 is present in the previously accessed user information storage 1220.

The operation process may vary depending on whether user information is present. As an example, when biometric data is previously registered and user information is present (YES), the process proceeds to operation S161. When biometric data is registered for the first time and user information is not present (NO), the process proceeds to operation S162. Thus, when the user information is present (YES) and when the user information is not present (NO), the process proceeds to operations S161 and S162 to perform a write (program) operation and to perform a write operation, respectively.

For example, when existing user information is present, the process proceeds to operation S161. As an example, a case in which biometric data has already been registered is included. When the user information is present (S151-YES) and in the case of the write operation (S161-YES), the process proceeds to operation S171 in which the user data management server 1000 performs a write operation, and then proceeds to operation S172 in which the user data management server 1000 performs a migration operation. This will be described below with reference to FIGS. 17, 18, and 19.

When existing user information is not present, the process proceeds to operation S162. As an example, a case in which biometric data is registered for the first time is included. When the user information is present (S151-YES) and in the case of the read operation (S161-NO), the user data management server 1000 performs a read operation (S173). This will be described below with reference to FIG. 20.

When the user information is not present (S151-NO) and in the case of the write operation (S162-YES), the process proceeds to operation S174 in which the user data management server 1000 performs a write operation. This will be described below with reference to FIG. 21. When the write operation is not performed in operation S162, a fail read operation occurs at operation S175.

FIG. 17 is a diagram illustrating the basic information storage, the user information storage, and the temporary information storage in operation S171 illustrated in FIG. 16, according to an example embodiment. FIG. 18 is a diagram illustrating the basic information storage, the user information storage, and the temporary information storage in operation S172 illustrated in FIG. 16, according to an example embodiment. FIG. 19 is a diagram illustrating the basic information storage, the user information storage, and the temporary information storage in operation S172 illustrated in FIG. 16, according to an example embodiment.

Referring to FIG. 17, in operation S171, the user data management server 1000 may manage information of the basic information storage 1210, the user information storage 1220, and the temporary information storage 1230. The user data management server 1000 may add user data to the user information storage 1220 even when the user information is present.

The user data management server 1000 may access 0x1000 to check the user information, and may perform a write operation to add the user data.

As an example, the user data management server 1000 may add user data in which biometric data is QWER123. The user data management server 1000 may obtain the tag number 0x1000 from the basic information storage 1210. The user data management server 1000 may access the address 0x1000 of the user information storage 1220 using the tag number 0x1000. The user data management server 1000 may obtain Hong Gildong 1222a as a user name 1221a, Gwonseon-gu, Suwon-si 1222b as a recent departure location 1221b, Yeongtong-gu, Suwon-si 1222c as a recent arrival location 1221c, and 20 km 1222d as a recent driving distance 1221d, at the address 0x1000 of the user information storage 1220.

Data is present at 0x1000, and thus, the user data management server 1000 may add data identification information 1221 and user data information 1222 to another zone. As an example, the user data management server 1000 may select address 0x6000 of the user information storage 1220 to add data identification information 1221 and user data information 1222.

The user data management server 1000 may determine a location to add user information, and may store the location information in the additional zone number information 1232 of the temporary information storage 1230.

The user data management server 1000 may store Hwaseong-si, Gyeonggi-do as a recent departure location, Namyangju-si, Gyeonggi-do as a recent arrival location, and 32 km as a driving distance, in an address 0x6000 of the user information storage 1220.

Referring to FIG. 18, in operation S172, the user data management server 1000 may manage information of the basic information storage 1210, the user information storage 1220, and the temporary information storage 1230. The user data management server 1000 may perform migration operation when data is distributed.

As an example, the user data management server 1000 may determine that user information on QWER123 is distributed, as biometric data, to addresses 0x1000 and 0x6000 in the user information storage 1220. In addition, the user data management server 1000 manages only the latest information of recent departure location, a recent arrival location, and a recent driving distance generated when a shared vehicle is used. Therefore, existing recent departure location, recent arrival location, and recent driving distance become unnecessary information.

The user data management server 1000 may temporarily designate a zone for a migration operation. As an example, the user data management server 1000 may select address 0x7000 of the user information storage 1220. The user data management server 1000 may store 0x7000 in the temporary zone number information 1233. The user data management server 1000 may merge data, excluding unnecessary information, at the address 0x7000. Accordingly, the user data management server 1000 may store Hwaseong-si, Gyeonggi-do, rather than Gwonseon-gu, Suwon-si, as a recent departure location, Namyangju-si, Gyeonggi-do, rather than Yeongtong-gu, Suwon-si, as a recent arrival location, and 32 km, rather than 20 km, as a recent driving distance.

Referring to FIG. 19, in operation S172, the user data management server 1000 may manage information of the basic information storage 1210, the user information storage 1220, and the temporary information storage 1230 after the migration operation thereof is completed.

As an example, the user data management server 1000 may overwrite the data, stored at 0x7000 in the user information storage 1220, to 0x1000 in the user information storage 1220. The user data management server 1000 may delete data stored at 0x6000 and 0x7000 in the user information storage 1220 that is no longer used. In addition, the user data management server 1000 may delete the additional zone number information 1232 and the temporary zone number information 1233 in the temporary information storage 1230.

FIG. 20 is a diagram illustrating the basic information storage, the user information storage, and the temporary information storage in operation S173 illustrated in FIG. 15, according to an example embodiment. Referring to FIG. 20, in operation S173, the user data management server 1000 may manage information of the basic information storage 1210, the user information storage 1220, and the temporary information storage 1230. The user data management server 1000 may perform a read operation when user information on biometric data is present.

As an example, when the biometric data is ASDF456, the user data management server 1000 may obtain 0x2000 as a tag number. The user data management server 1000 may access 0x2000 of the user information storage 1220 to read Gangnam-gu, Seoul as a recent departure location, Ansan-si, Gyeonggi-do as a recent arrival location, 5 L as carbon emission, and 840 km as monthly driving distance.

FIG. 21 is a diagram illustrating the basic information storage, the user information storage, and the temporary information storage in operation S174 illustrated in FIG. 15, according to an example embodiment. Referring to FIG. 21, the user data management server 1000 may manage information of the basic information storage 1210, the user information storage 1220, and the temporary information storage 1230 in operation S174. The user data management server 1000 may perform a write operation when user information on biometric data is not present.

As an example, when the biometric data of the above-mentioned user D is TYUI147 and the tag number is 0x5000, the user data management server 1000 may store Hwaseong-si, Gyeonggi-do as a recent departure location, Namyangju-si, Gyeonggi-do as a recent arrival location, and 32 km as a recent driving distance. The user data management server 1000 may obtain 0x5000 as a tag number for biometric data TYUI147. The user data management server 1000 may access 0x5000 of the user information storage 1220 to sequentially store Hwaseong-si, Gyeonggi-do as a recent departure location, Namyangju-si, Gyeonggi-do as a recent arrival location, and 32 km as a recent driving distance.

The user data management server 1000 may terminate a process without migration operation because all user information is stored in a single page or a single block and unnecessary information is not present.

FIG. 22 is a diagram illustrating the basic information storage, the user information storage, and the temporary information storage in operation S175 illustrated in FIG. 16, according to an example embodiment.

Referring to FIG. 22, the user data management server 1000 may manage information of the basic information storage 1210, user information storage 1220, and temporary information storage 1230 in operation S175. When the user data management server 1000 performs a read operation even in the case in which user information on biometric data is not present, a read operation may fail.

As an example, when the biometric data is TYUI147, the user data management server 1000 may obtain 0x5000 as a tag number. The user data management server 1000 may access 0x5000 of the user information storage 1220, but may not read user information because the user information storage 1220 is empty. Accordingly, the user data management server 1000 may fail to perform a read operation, and may terminate a process.

The user data management server 1000 may store user information in a single block, a single page, or a single zone to read all user information with only one memory access. As described above, by reducing the number of memory accesses by just one, the execution speed of the read operation may be reduced.

The user data management server 1000 may enhance the security of user information by matching a tag number, an address value for a specific area, with a single piece of biometric data such that only an individual with the corresponding biometric data is allowed to access the user data management server 1000.

In the future, big data may be built by collecting movement patterns such as departure information, destination information, route selection, and driving distance information obtained by collecting user information, charging patterns obtained through information on the use of gas stations or charging stations, and energy consumption information and carbon emissions information based on the energy consumption information.

The built big data may be analyzed to optimize placement, routes, and traffic flow of shared vehicles. Accordingly, energy consumption and carbon emission may be reduced.

When user information is backed up on a data server and data is allowed to be read when a vehicle to be shared is selected, the same setting value may be applied to any vehicle. Accordingly, users may drive in the same environment even when a vehicle is changed.

FIG. 23 is a block diagram illustrating an example in which the data storage device illustrated in FIG. 1 is implemented as a solid state drive (SSD), according to an example embodiment.

Referring to FIG. 23, an SSD 4000 may include a plurality of flash memories 4101 to 4104 and an SSD controller 4200.

The first and second flash memories 4101 and 4102 may be connected to the SSD controller 4200 through a first channel CH1. The third and fourth flash memories 4103 and 4104 may be connected to the SSD controller 4200 through a second channel CH2. The number of channels connected to the SSD controller 4200 may be 2 or more. The number of flash memories connected to a single channel may be 2 or more.

The SSD controller 4200 may include a host interface 4201, a flash interface 4202, a buffer interface 4203, a control unit 4210, and a work memory 4220. The SSD controller 4200 may be connected to a host 1000 through the host interface 4201. Depending on a request of the host 1000, the SSD controller 4200 may write data in the corresponding flash memory or may read data from the corresponding flash memory.

The SSD controller 4200 may be connected to the plurality of flash memories 4101 to 4104 through the flash interface 4202 and may be connected to a buffer memory 4300 through the buffer interface 4203. The flash interface 4202 may provide data, temporarily stored in the buffer memory 4300, to the flash memories through the channels CH1 and CH2. The flash interface 4202 may transfer the data, read from the flash memories 4101 to 4104, to the buffer memory 4300.

The control unit 4210 may analyze and process a signal received from the host 1000. The control unit 4210 may control the host 1000 or the flash memories 4101 to 4104 through the host interface 4201 or the flash interface 4202. The control unit 4210 may control operations of the flash memories 4101 to 4104 using firmware for driving the SSD 4000.

The SSD controller 4200 may manage data to be stored in the flash memories 4101 to 4104. In a sudden power-off event, the SSD controller 4200 may back up the data, stored in the work memory 4220 or the buffer memory 4300, to the flash memories 4101 to 4104.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

As set forth above, a user data management server in a vehicle sharing system according to example embodiments may manage user data using tag numbers to improve both user data security and data access efficiency, leading to faster data access.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A shared vehicle management server of a vehicle sharing system that allows a plurality of users to share and use a vehicle, the shared vehicle management server comprising:

an interface that receives biometric data from the plurality of users;

a storage device that stores the biometric data received through the interface; and a controller that assigns a unique tag number to each of the plurality of users and manages the biometric data of each of the plurality of users using the unique tag number, wherein the shared vehicle management server operates as a host system in communication with one or more shared vehicles that transmit biometric data of the plurality of users to the interface, wherein the controller stores the biometric data of each of the plurality of users in a same storage area of the storage device using the unique tag number, wherein the unique tag number is an address value identifying a block of the storage device, wherein the controller maintains the unique tag number for a same user when biometric data stored in the identified block becomes invalid, and wherein the controller re-stores updated biometric data associated with the same user into a different block of the storage device while preserving the maintained unique tag number.

2. The shared vehicle management server of claim 1, wherein the controller identifies whether newly input biometric data is biometric data of a registered user.

3. The shared vehicle management server of claim 2, wherein the controller determines, when the newly input biometric data is the biometric data of the registered user, whether a tag number generated from the corresponding biometric data is present.

4. The shared vehicle management server of claim 3, wherein the controller performs a write operation or a read operation on a storage area of the storage device, to which a tag number is assigned, when the tag number generated from the corresponding biometric data is present.

5. The shared vehicle management server of claim 4, wherein the storage area is one or more memory blocks.

6. The shared vehicle management server of claim 3, wherein the controller assigns a tag number and a storage area, and perform a write operation or a read operation on the assigned storage area when the tag number generated from the corresponding biometric data is not present.

7. The shared vehicle management server of claim 1, wherein the storage device comprises:

a basic information storage area stores the biometric data and the tag number;

a user information storage area stores data identification information and user data information; and a temporary information storage area used to perform a migration operation.

8. The shared vehicle management server of claim 1, wherein the storage device is a flash storage device.

9. A method of operating a host system including a shared vehicle management server and communicating with one or more shared vehicles, the method comprising:

receiving biometric data from a plurality of users;

storing the received biometric data in a flash storage device; and assigning a unique tag number to each of the plurality of users and managing the assigned unique tag number, wherein the biometric data of each of the plurality of users is stored in a same storage area using the unique tag number, wherein the unique tag number is an address value identifying a block of the flash storage device, wherein the method further comprises maintaining the unique tag number for a same user when biometric data stored in the identified block becomes invalid, and wherein the method further comprises re-storing updated biometric data associated with the same user into a different block of the flash storage device while preserving the maintained unique tag number.

10. The method of claim 9, further comprising:

identifying whether newly input biometric data is biometric data of a registered user.

11. The method of claim 10, further comprising:

determining, when the newly input biometric data is the biometric data of the registered user, whether a tag number generated from a corresponding biometric data is present.

12. The method of claim 11, further comprising:

performing a write operation or a read operation on a storage area, to which a tag number is assigned, when the tag number generated from the corresponding biometric data is present; and assigning a tag number and a storage area when the tag number generated from the corresponding biometric data is not present, and performing the write operation or the read operation on the assigned storage area.

13. A user data management server configured to use biometric information to provide vehicle sharing service, the user data management server comprising:

an interface that receives biometric data and user data from a user;

a storage device that stores the biometric data, a tag number, and the user data received from the interface; and a controller that manages the user data using the biometric data and the tag number of the storage device, wherein the shared vehicle management server operates as a host system in communication with one or more shared vehicles that transmit biometric data of the user to the interface, wherein the storage device comprises:

a basic information storage area that stores the biometric data and the tag number;

a user information storage area that stores data identification information and user data information; and a temporary information storage area used to perform a migration operation, wherein the tag number is an address value identifying a block of the storage device, wherein the controller maintains the tag number for a same user when biometric data stored in the identified block becomes invalid, and wherein the controller re-stores updated biometric data associated with the same user into a different block of the storage device while preserving the maintained tag number, wherein the user information storage area comprises one or more blocks, the one or more blocks comprise one or more pages, and a write operation and a read operation are performed in units of a page and an erase operation is performed in units of a block.

14. The user data management server of claim 13, wherein the tag number is a single number assigned to a single piece of biometric data.

15. The user data management server of claim 13, wherein the user information storage area stores the data identification information on a single piece of biometric data and the user data information in a single block or a single page.

16. The user data management server of claim 15, wherein the controller performs a read operation once on a single piece of biometric data to read all user data.

* * * * *